United States Patent [19]
Yoshida

[11] Patent Number: 6,091,766
[45] Date of Patent: Jul. 18, 2000

[54] DATA COMMUNICATION APPARATUS HAVING ITU-T RECOMMENDATION V.34 COMMUNICATION FUNCTION

[75] Inventor: Takehiro Yoshida, Tokyo, Japan

[73] Assignee: Canon Kabushiki Kaisha, Tokyo, Japan

[21] Appl. No.: 08/957,923

[22] Filed: Oct. 27, 1997

[30] Foreign Application Priority Data

Oct. 28, 1996 [JP] Japan ................................ 8-302491

[51] Int. Cl.[7] .............................. H03H 7/30; H03H 7/40; H03K 5/159
[52] U.S. Cl. ........................................ 375/231; 375/222
[58] Field of Search .................................. 375/222, 219, 375/229, 232; 455/73; 364/724.2

[56] References Cited

U.S. PATENT DOCUMENTS

| | | | |
|---|---|---|---|
| 4,910,506 | 3/1990 | Yoshida et al. ............... | 340/825.07 |
| 5,048,054 | 9/1991 | Eyuboglu et al. .............. | 375/222 |
| 5,239,576 | 8/1993 | Yoshida et al. ................ | 379/355 |
| 5,654,982 | 8/1997 | Goodson et al. .............. | 375/222 |
| 5,715,277 | 2/1998 | Goodson et al. .............. | 375/222 |
| 5,790,594 | 8/1998 | Peng .............................. | 375/222 |
| 5,844,940 | 12/1998 | Goodson et al. .............. | 375/222 |
| 5,847,752 | 12/1998 | Sebestyen ...................... | 348/17 |
| 5,870,429 | 2/1999 | Moran, III et al. ............. | 375/222 |
| 5,898,764 | 4/1999 | Yoshida .......................... | 379/100 |

*Primary Examiner*—Chi H. Pham
*Assistant Examiner*—Bryan Webster
*Attorney, Agent, or Firm*—Fitzpatrick, Cella, Harper & Scinto

[57] ABSTRACT

This invention improves the success rate of rereception of a primary channel equalizer training signal, which is performed when, in a data communication apparatus having an ITU-T recommendation V.34 communication function, a control circuit performs control to receive a line probing signal, and thereafter, shift to reception of a primary channel equalizer training signal, and to control circuit performs control to, when the primary channel equalizer training signal is not detected within a predetermined time, send a tone A signal and receive a tone B signal, and thereafter, shift to transmission of a limited INFOh signal.

8 Claims, 6 Drawing Sheets

DATA COMMUNICATION APPARATUS HAVING ITU-T RECOMMENDATION V.34 COMMUNICATION FUNCTION

BACKGROUND OF THE INVENTION

1. Field of the Invention

The present invention relates to a data communication apparatus having an ITU-T (Telecommunication Standardization Sector of International Telecommunication Union) recommendation V.34 communication function.

2. Related Background Art

Conventionally, in the ITU-T recommendation V.34 communication, after a receiver receives a line probing signal and transmits an INFOh signal, and it shifts to reception of a primary channel equalizer training signal.

If the receiver fails to receive the primary channel equalizer training signal, it transmits a tone A signal and receives a tone B signal. Thereafter, the receiver transmits an INFOh signal and then shifts to reception of a primary channel equalizer training signal again. The INFOh signal transmitted at this time is the same as that previously transmitted.

In the prior art, however, when the second primary channel equalizer training signal is to be received, the same INFOh signal as in the first reception of the primary channel equalizer training signal is transmitted. For this reason, reception of the primary channel equalizer training signal often fails again. In this case, the initial identification timer (T1 timer) is up, resulting in a communication error.

SUMMARY OF THE INVENTION

The present invention has been made in consideration of the above problem, and has as its object to improve a data communication apparatus.

It is another object of the present invention to provide a data communication apparatus capable of increasing the success rate of rereception of a primary channel equalizer training signal in ITU-T recommendation V.34 communication.

Other objects of the present invention will be apparent from the following detailed description of embodiments and accompanying drawings.

DETAILED DESCRIPTION OF THE PREFERRED EMBODIMENTS

The embodiments of the present invention will be described below in detail with reference to the accompanying drawings.

Figure 1:
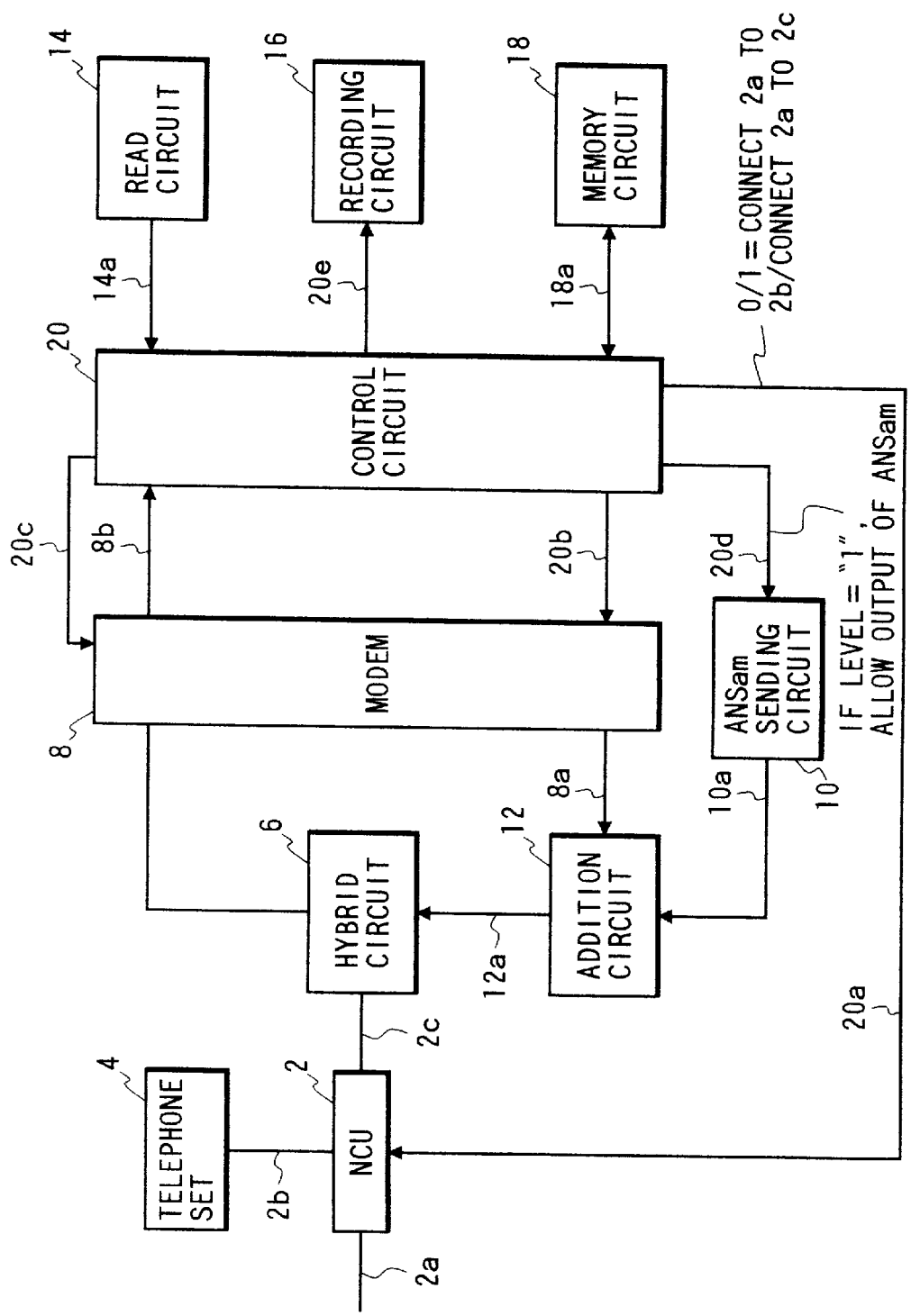
FIG. 1 is a block diagram showing an embodiment of the present invention.

FIG. 1 is a block diagram showing the arrangement of a facsimile apparatus according to an embodiment of the present invention.

An NCU (Network Control Unit) 2 is connected to the terminal of a telephone line to use a telephone network for data communication or the like, and performs connection control of the telephone switching network, switches the line to a data communication path, or holds a loop. When the signal level (signal line 20a) from a control circuit 20 is "0", the NCU 2 connects a telephone line 2a to the telephone set 4 side. When the signal level is "1", the NCU 2 connects the telephone line 2a to the facsimile apparatus side. In a normal state, the telephone line 2a is connected to the telephone set 4 side.

A hybrid circuit 6 separates transmission- and reception-system signals. The hybrid circuit 6 sends a transmission signal from an addition circuit 12 to the telephone line 2a via the NCU 2, and receives a signal from the other end system via the NCU 2 and sends it to a modem 8 via a signal line 6a.

The modem 8 performs modulation/demodulation based on the ITU-T recommendation V.8, V.21, V.27ter, V.29, V.17, or V.34. Each transmission mode is designated by a signal line 20c. The modem 8 receives a signal output to a signal line 20b and outputs modulated data to a signal line 8a, or receives a reception signal output to the signal line 6a and outputs demodulated data to a signal line 8b.

An ANSam sending circuit 10 sends an ANSam signal. When a signal of signal level "1" is output to a signal line 20d, the ANSam sending circuit 10 sends an ANSam signal to a signal line 10a. When a signal of signal level "0" is output to the signal line 20d, no signal is output to the signal line 10a.

The addition circuit 12 receives information on the signal line 8a and information on the signal line 10a and outputs the addition result to a signal line 12a. A read circuit 14 reads an original image and outputs the read image data to a signal line 14a. A recording circuit 16 sequentially records information output to a signal line 20e in units of lines.

A memory circuit 18 is used to store raw information of read data or coded information, or store received information or decoded information.

The control circuit 20 is constituted by a microcomputer, a ROM (Read-Only Memory) storing the control program, a RAM (Random Access Memory), and the like. The control circuit 20 executes the program stored in the ROM to control execution of ITU-T recommendation V.34 communication. After a line probing signal is received, processing shifts to reception of a primary channel equalizer training signal. If no primary channel equalizer training signal is detected within a predetermined time, a tone A signal is transmitted from the receiver, and a tone B signal is received. Thereafter, processing shifts to transmission of a limited INFOh signal.

In the first embodiment of the present invention, for the limited INFOh signal, the symbol rate used in data transmission is lowered.

Figure 2:
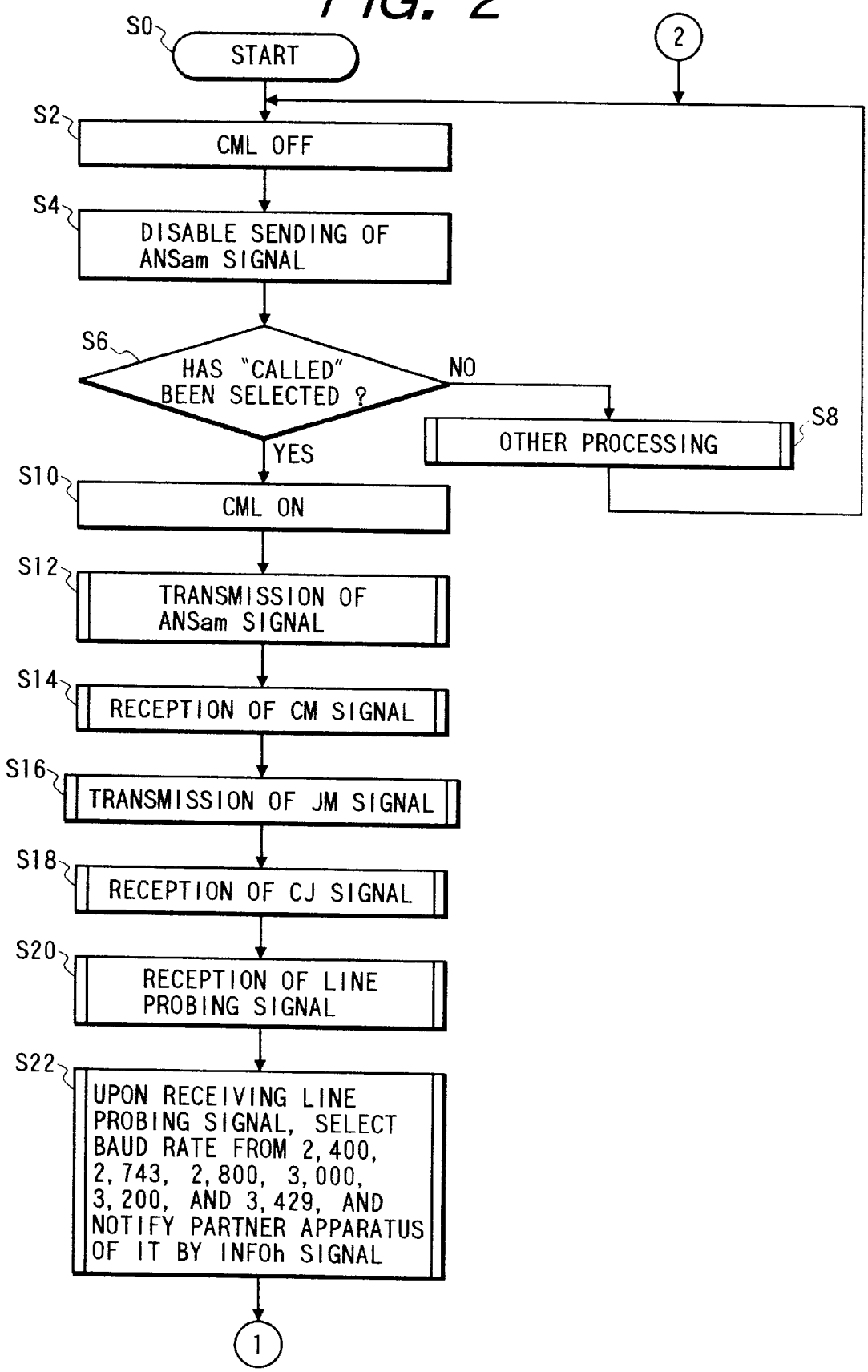
FIG. 2 is a flow chart showing an operation in the first embodiment.
Figure 3:
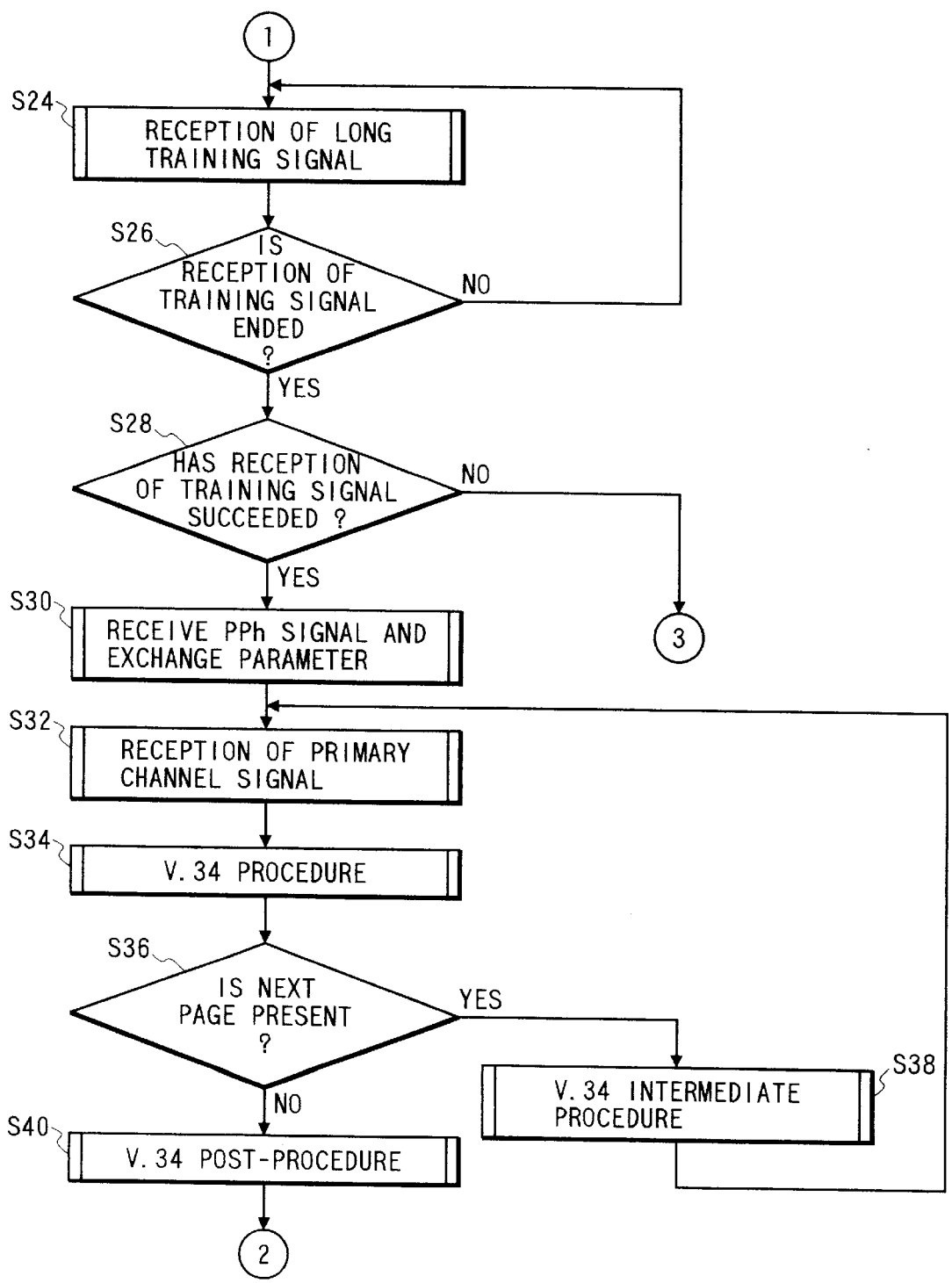
FIG. 3 is a flow chart showing an operation in the first embodiment.
Figure 4:
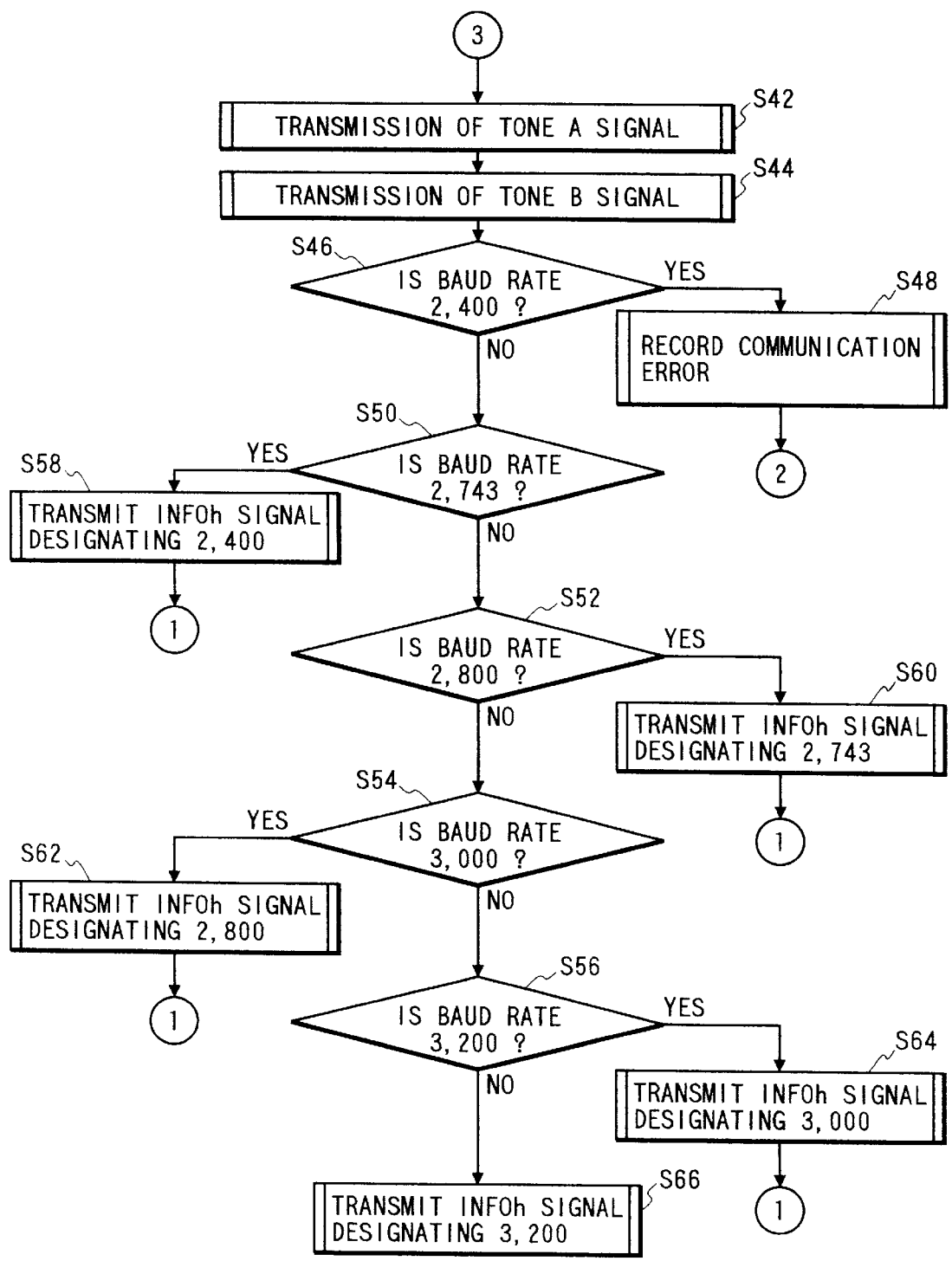
FIG. 4 is a flow chart showing an operation in the first embodiment.

FIGS. 2 to 4 are flow charts showing the control operation of the control circuit 20 in the first embodiment of the present invention. This processing flow is executed by the microcomputer in the control circuit 20 in accordance with the computer program stored in the ROM.

In FIG. 2, the control circuit 20 starts the operation in step S0. In S2, a signal of signal level "0" is output to the signal line 20a to turn off the CML. In step S4, a signal of signal level "0" is output to the signal line 20d to disable sending of an ANSam signal.

In step S6, the control circuit 20 determines whether call reception has been selected. If YES in step S6, the flow advances to step S10. If NO in step S6, the flow advances to step S8 to perform other processing, and the flow returns to step S2.

In step S10, the control circuit 20 outputs a signal of signal level "1" to the signal line 20a to turn on the CML. Thereafter, transmission of an ANSam signal in step S12, reception of a CM signal in step S14, transmission of a JM signal in step S16, reception of a CJ signal in step S18, and reception of a line probing signal in step S20 are sequentially performed.

Upon receiving the line probing signal, the control circuit 20 selects a baud rate from 2,400, 2,743, 2,800, 3,000, 3,200, and 3,429 and notifies the partner apparatus of it using an INFOh signal in step S22.

In step S24, the control circuit 20 receives a long training signal. It is determined in step S26 whether reception of the training signal is ended. If YES in step S26, the flow advances to step S28. If NO in step S26, the flow advances to step S24.

It is determined in step S28 whether reception of the training signal has succeeded. If YES in step S28, the flow advances to step S30. If NO in step S28, the flow advances to step S42.

In step S30, a PPh signal is received, and then, parameter exchange is performed. In step S32, a primary channel signal is received. In step S34, the V.34 procedure is executed.

It is determined in step S36 whether the next page is present. If YES in step S36, the flow advances to step S38 to execute the V.34 intermediate procedure, and the flow returns to step S32. If NO in step S36, the flow advances to step S40 to execute the V.34 post-procedure, and the flow returns to step S2.

In step S42, the tone A signal is transmitted. In step S44, the tone B signal is received.

It is determined in step S46 whether the baud rate used in the current reception is 2,400. If YES in step S46, the flow advances to step S48 to record a communication error because the baud rate cannot be lowered anymore, and the flow returns to step S2.

If NO in step S46, the flow advances to step S50. In steps S50, S52, S54, and S56, the baud rate used in the current reception is determined. If the baud rate is 2,473, the flow advances to step S58 to transmit an INFOh signal at a baud rate of 2,400. If the baud rate is 2,800, the flow advances to step S60 to transmit an INFOh signal at a baud rate of 2,743. If the baud rate is 3,000, the flow advances to step S62 to transmit an INFOh signal at a baud rate of 2,800. If the baud rate is 3,200, the flow advances to step S64 to transmit an INFOh signal at a baud rate of 3,000. If the baud rate is 3,429, the flow advances to step S66 to transmit an INFOh signal at a baud rate of 3,200. In any case, the flow returns to step S24.

The second embodiment of the present invention will be described next.

In the second embodiment, for the limited INFOh signal, the training time is extended.

Figure 5:
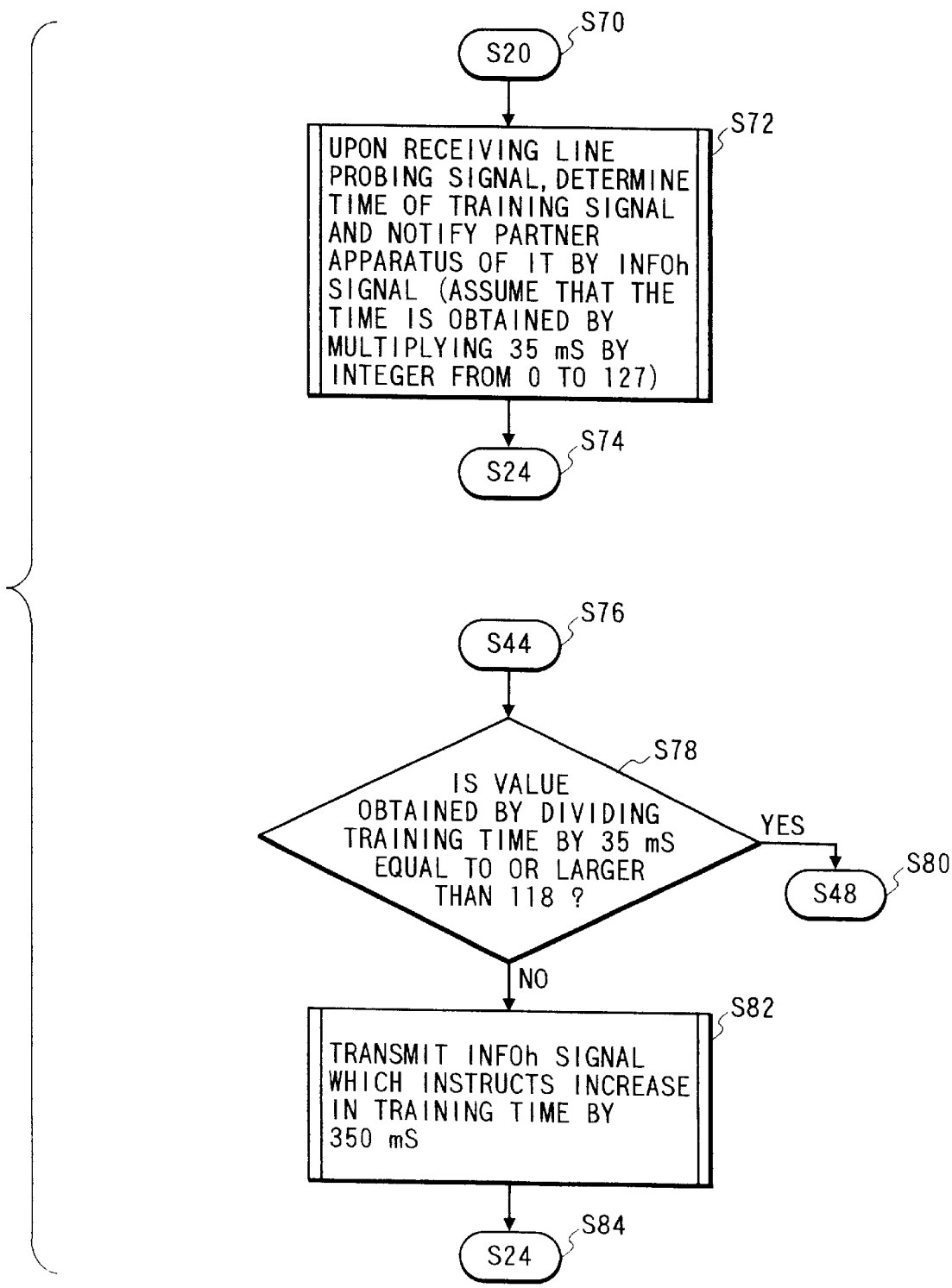
FIG. 5 is a flow chart showing an operation in the second embodiment.

FIG. 5 is a flow chart showing part of the operation of the second embodiment, which is different from the first embodiment (FIGS. 2 to 4).

In FIG. 5, step S70 corresponds to step S20. Upon receiving a line probing signal, the time of a training signal is determined, and the partner apparatus is notified of it by an INFOh signal in step S72. Assume that the training time is obtained by multiplying 35 ms by an integer from 0 to 127. Thereafter, the flow advances to step S74 corresponding to step S24.

Step S76 corresponds to step S44. It is determined in step S78 whether the value obtained by dividing the time of the training signal in the current reception by 35 ms is equal to or larger than 118. If YES in step S78, the flow advances to step S80 (S48). If NO in step S78, the flow advances to step S82 to transmit an INFOh signal which designates a training time increased by 350 ms, and the flow advances to step S84 corresponding to step S24.

The third embodiment of the present invention will be described next.

In the third embodiment, for the limited INFOh signal, the preemphasis amount is increased.

Figure 6:
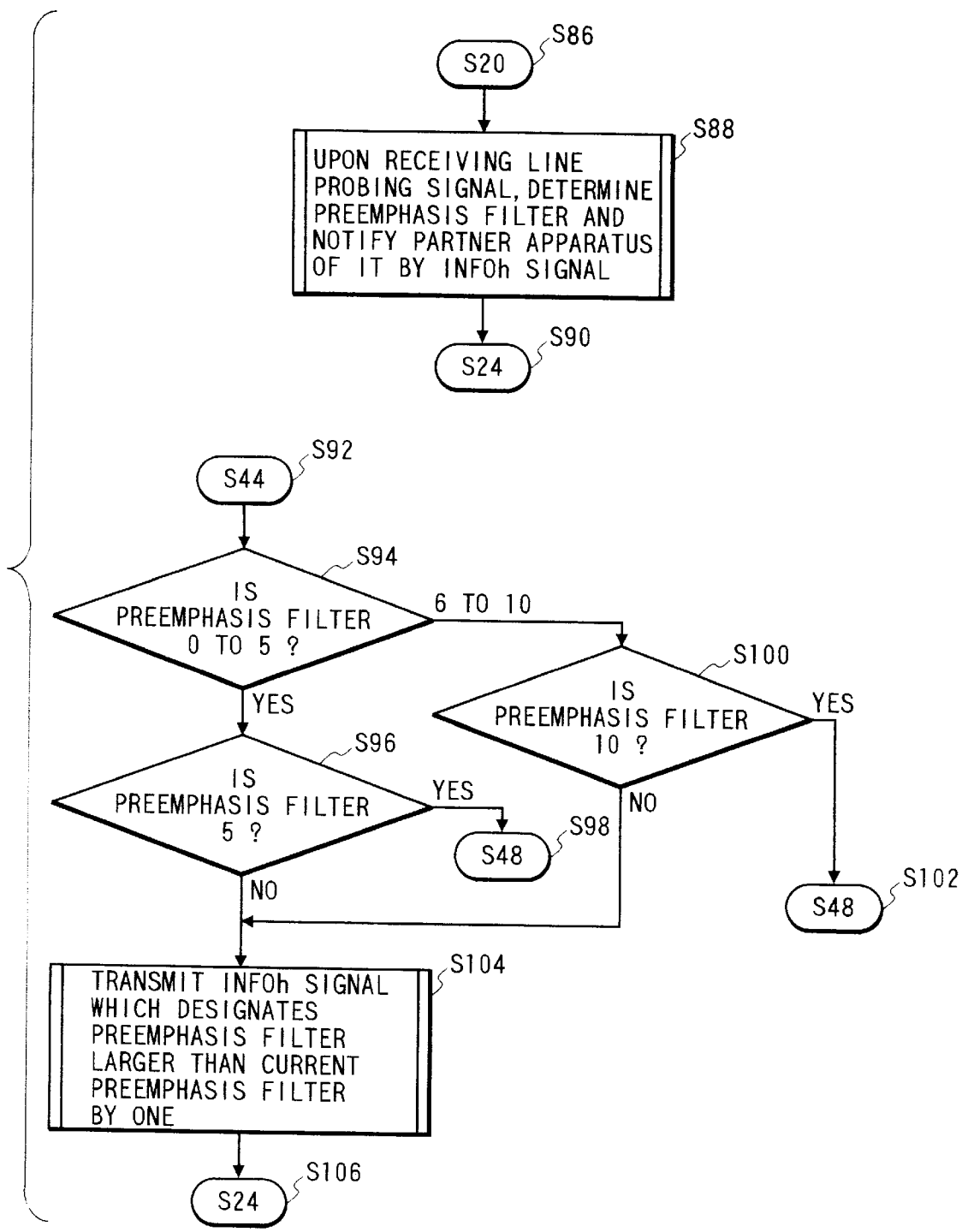
FIG. 6 is a flow chart showing an operation in the third embodiment.

FIG. 6 is a flow chart showing part of the operation of the third embodiment, which is different from the first embodiment (FIGS. 2 to 4).

In FIG. 6, step S86 corresponds to step S20. Upon receiving a line probing signal, a preemphasis filter is determined, and the partner apparatus is notified of it by an INFOh signal in step S88. Thereafter, the flow advances to step S90 corresponding to step S24.

Step S92 corresponds to step S44. It is determined in step S94 whether the preemphasis filter in this reception is 0 to 5. If YES in step S94, the flow advances to step S96. If the preemphasis filter is 6 to 10, the flow advances to step S100.

It is determined in step S100 whether the preemphasis filter is 10. If YES in step S100, the flow advances to step S102 (S48). If NO in step S100, the flow advances to step S104.

In step S104, an INFOh signal which designates a preemphasis filter larger than the current preemphasis filter by one is transmitted. Thereafter, the flow advances to step S106 corresponding to step S24.

As the fourth embodiment of the present invention, control may be executed while combining two or three of the limited INFOh signals in the first to third embodiment.

As has been described above, according to the above-described embodiments, when the receiver fails to receive a primary channel equalizer training signal and again performs reception of a primary channel equalizer training signal, the success rate of rereception can be increased. Therefore, an error due to time up of the initial identification timer can be prevented, and the communication can continue.

According to the above embodiment, when the receiver fails to receive a primary channel equalizer training signal, the symbol rate used in data transmission is lowered. With this arrangement, the success rate of rereception can be increased, and the communication can continue at a higher probability.

According to the above embodiment, when the receiver fails to receive a primary channel equalizer training signal, the training time is extended. With this arrangement, the success rate of rereception can be increased, and the communication can continue at a higher probability.

According to the above embodiment, when the receiver fails to receive a primary channel equalizer training signal, the preemphasis amount is increased. With this arrangement, the success rate of rereception can be increased, and the communication can continue at a higher probability.

The present invention is not limited to the above embodiments, and various changes and modifications can be made.

What is claimed is:

1. A data communication method in a data communication apparatus having at least a tone A signal, a tone B signal and an INFOh signal, comprising the steps of:

receiving a line probing signal and therafter shifting to reception of a primary channel equalizer training signal; and when the primary channel equalizer training signal is not detected within a predetermined time, sending a tone A signal and receiving a tone B signal, and thereafter, shifting to transmission of a limited INFOh signal.

2. A method according to claim 1, wherein, for the limited INFOh signal, a symbol rate used in data transmission is set to be lower.

3. A method according to claim 1, wherein, for the limited INFOh signal, a training time is set to be longer.

4. A method according to claim 1, wherein, for the limited INFOh signal, a preemphasis amount is set to be larger.

5. A data communication apparatus having at least a tone A signal, a tone B signal and an INFOh signal, comprising:

a modem for modulating/demodulating a signal for communication; and control means capable of controlling said modem so as to execute communication;

wherein said control means performs control to receive a line probing signal, and thereafter, shift to reception of a primary channel equalizer training signal, said control means performing control to, when the primary channel equalizer training signal is not detected within a predetermined time, send a tone A signal and receive a tone B signal, and thereafter, shift to transmission of a limited INFOh signal.

6. An apparatus according to claim 5, wherein, for the limited INFOh signal, a symbol rate used in data transmission is set to be lower.

7. An apparatus according to claim 5, wherein, for the limited INFOh signal, a training time is set to be longer.

8. An apparatus according to claim 5, wherein, for the limited INFOh signal, a preemphasis amount is set to be larger.

* * * * *